US008535137B2

(12) United States Patent
Stone

(10) Patent No.: US 8,535,137 B2
(45) **Date of Patent: *Sep. 17, 2013**

(54) CARD GAME METHODS AND COMPUTER-READABLE MEDIUM FOR A CARD GAME INCORPORATING SCATTER AWARDS

(75) Inventor: Jay B. Stone, Las Vegas, NV (US)

(73) Assignee: Blue Cube Microworks, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,393

(22) Filed: Apr. 9, 2012

(65) Prior Publication Data

US 2012/0196663 A1 Aug. 2, 2012

Related U.S. Application Data

(63) Continuation of application No. 12/257,034, filed on Oct. 23, 2008, now Pat. No. 8,182,324.

(51) Int. Cl.

| | |
|---|---|
| ***G06F 17/00*** | (2006.01) |
| ***G06F 19/00*** | (2011.01) |
| ***A63F 9/24*** | (2006.01) |
| ***A63F 13/00*** | (2006.01) |

(52) U.S. Cl.
USPC .................. 463/13; 463/11; 463/25; 273/292

(58) Field of Classification Search
USPC ........ 463/11–13, 16–20, 25, 29–31; 273/292
See application file for complete search history.

(56) References Cited

U.S. PATENT DOCUMENTS

| | | | | |
|---|---|---|---|---|
| 4,700,948 | A * | 10/1987 | Okada | 273/143 R |
| 5,042,818 | A * | 8/1991 | Weingardt | 463/13 |
| 5,531,440 | A * | 7/1996 | Dabrowski et al. | 463/12 |
| 5,732,950 | A * | 3/1998 | Moody | 273/292 |
| 5,803,809 | A * | 9/1998 | Yoseloff | 463/13 |
| 5,816,916 | A * | 10/1998 | Moody | 463/13 |
| 5,823,873 | A * | 10/1998 | Moody | 463/13 |
| 6,007,066 | A * | 12/1999 | Moody | 273/292 |
| 6,012,719 | A * | 1/2000 | Webb | 273/292 |
| 6,220,959 | B1 * | 4/2001 | Holmes et al. | 463/13 |
| 6,270,405 | B1 * | 8/2001 | Ferguson | 463/13 |
| 6,322,445 | B1 * | 11/2001 | Miller | 463/13 |
| 6,334,613 | B1 * | 1/2002 | Yoseloff | 273/292 |
| 6,443,456 | B1 * | 9/2002 | Gajor | 273/303 |
| 6,561,898 | B2 * | 5/2003 | Moody | 463/13 |
| 6,955,356 | B2 * | 10/2005 | Moody | 273/292 |
| 6,976,917 | B2 * | 12/2005 | Peccole, Jr. | 463/13 |
| 7,007,953 | B1 * | 3/2006 | Cabot | 273/292 |

(Continued)

*Primary Examiner* — Milap Shah
(74) *Attorney, Agent, or Firm* — Holland & Hart LLP

(57) ABSTRACT

A method for providing a payout based on a scattered combination of game cards is described. A plurality of hands of cards is displayed, including at least a first hand of cards and a second hand of cards. Each hand of cards includes one or more card positions. In each hand of cards, a card is placed in each of the one or more card positions. Characteristics associated with each card in the each displayed hand of cards are analyzed. A first card in a first card position in the first hand of cards is combined with a second card in the second hand of cards. A determination is made whether a winning combination of cards is formed by at least the first and second cards in the first and second hands of cards. A payout award is provided based on the winning combination of cards.

22 Claims, 14 Drawing Sheets

(56) References Cited

U.S. PATENT DOCUMENTS

| | | | | |
|---|---|---|---|---|
| 7,222,857 | B2 * | 5/2007 | Moody | 273/292 |
| 7,614,946 | B2 * | 11/2009 | Nicely | 463/13 |
| 8,182,324 | B2 * | 5/2012 | Stone | 463/13 |
| 2002/0074725 | A1 * | 6/2002 | Stern | 273/274 |
| 2002/0082069 | A1 * | 6/2002 | Parker | 463/13 |
| 2004/0127276 | A1 * | 7/2004 | Moody | 463/13 |
| 2004/0183255 | A1 * | 9/2004 | Miller | 273/292 |
| 2004/0204235 | A1 * | 10/2004 | Walker et al. | 463/29 |
| 2004/0251630 | A1 * | 12/2004 | Sines et al. | 273/274 |
| 2006/0189363 | A1 * | 8/2006 | Strom | 463/13 |
| 2010/0105467 | A1 * | 4/2010 | Stone | 463/22 |

* cited by examiner

700

| HAND PAYS | | | | | |
|---|---|---|---|---|---|
| | 1 | 2 | 3 | 4 | 5 |
| Royal Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 8 | 16 | 24 | 32 | 40 |
| Flush | 5 | 10 | 15 | 20 | 25 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

FIG. 5A

702

| SCATTER PAYS | | | | | |
|---|---|---|---|---|---|
| | 1 | 2 | 3 | 4 | 5 |
| Five Same Suit & Rank (Aces) | 100 | 200 | 300 | 400 | 500 |
| Five Ace-of-Spades (Option) | 100 | 200 | 300 | 400 | Progres sive |
| Five Ace-of-Hearts (Option) | 100 | 200 | 300 | 400 | Progres sive |
| Five Ace-of-Diamonds (Option) | 100 | 200 | 300 | 400 | Progres sive |
| Five Ace-of-Clubs (Option) | 100 | 200 | 300 | 400 | Progres sive |
| Five Same Suit & Rank (J..K) | 50 | 100 | 150 | 200 | 250 |
| Five Same Suit & Rank (2..9) | 10 | 20 | 30 | 40 | 50 |

FIG. 5B

704

| SCATTER PAYS | | | | | |
|---|---|---|---|---|---|
| | 1 | 2 | 3 | 4 | 5 |
| Nine-or-More-of-a-Kind | 1000 | 2000 | 3000 | 4000 | 8000 or Progres sive |
| Eight-of-a-Kind | 300 | 600 | 900 | 1200 | 1500 |
| Seven-of-a-Kind | 200 | 400 | 600 | 800 | 1000 |
| Scatter Royal Flush | 100 | 200 | 300 | 400 | 500 |
| Six-of-a-Kind | 75 | 150 | 225 | 300 | 375 |
| Five-of-a-Kind | 50 | 100 | 150 | 200 | 250 |
| Four-of-a-Kind | 25 | 50 | 75 | 100 | 125 |

FIG. 5C

706

| SCATTER PAYS | | | | | |
|---|---|---|---|---|---|
| | 1 | 2 | 3 | 4 | 5 |
| 10 Red Suns | 10000 | 20000 | 30000 | 40000 | Progres sive |
| 10 Yellow Suns | 5000 | 10000 | 15000 | 20000 | Progres sive |
| 10 Blue Suns | 2000 | 4000 | 6000 | 8000 | 10000 |
| 10 Red Stars | 1000 | 2000 | 3000 | 4000 | 5000 |
| 10 Yellow Stars | 900 | 1800 | 2700 | 3600 | 4500 |
| 10 Blue Stars | 800 | 1600 | 2400 | 3200 | 4000 |
| 10 Red Moons | 700 | 1400 | 2100 | 2800 | 3500 |
| 10 Yellow Moons | 500 | 1000 | 1500 | 2000 | 2500 |
| 10 Blue Moons | 400 | 800 | 1200 | 1600 | 2000 |
| 10 Any Suns | 300 | 600 | 900 | 1200 | 1500 |
| 10 Any Stars | 200 | 400 | 600 | 800 | 1000 |
| 10 Any Moons | 100 | 200 | 300 | 400 | 500 |
| 20 or More Any Sun/Star/Moon | 50 | 100 | 150 | 200 | 250 |
| 10 or More Any Sun/Star/Moon | 25 | 50 | 75 | 100 | 125 |

FIG. 5D

708

| SCATTER PAYS | | | | | |
|---|---|---|---|---|---|
| | 1 | 2 | 3 | 4 | 5 |
| Flush (20 or More Same Suit) | 200 | 400 | 600 | 800 | 2000 or Progres sive |
| Flush (19 Same Suit) | 190 | 380 | 570 | 760 | 950 |
| Flush (18 Same Suit) | 180 | 360 | 540 | 720 | 900 |
| Flush (17 Same Suit) | 170 | 340 | 510 | 680 | 850 |
| Flush (16 Same Suit) | 160 | 320 | 480 | 640 | 800 |
| Flush (15 Same Suit) | 150 | 300 | 450 | 600 | 750 |
| Flush (14 Same Suit) | 140 | 280 | 420 | 560 | 700 |
| Flush (13 Same Suit) | 130 | 260 | 390 | 520 | 650 |
| Flush (12 Same Suit) | 120 | 240 | 360 | 480 | 600 |
| Flush (11 Same Suit) | 110 | 220 | 330 | 440 | 550 |
| Flush (10 Same Suit) | 100 | 200 | 300 | 400 | 500 |

FIG. 5E

710

| SCATTER PAYS | | | | | |
|---|---|---|---|---|---|
| | 1 | 2 | 3 | 4 | 5 |
| Triple Natural Royal Flush | 10000 | 20000 | 30000 | 40000 | Progres sive |
| Triple Scatter Royal Flush | 8000 | 16000 | 24000 | 30000 | Progres sive |
| Double Natural Royal Flush | 5000 | 10000 | 15000 | 20000 | Progres sive |
| Double Scatter Royal Flush | 4000 | 8000 | 12000 | 16000 | 20000 |
| Five Wild Cards | 3000 | 6000 | 9000 | 12000 | 15000 |
| Seven Same Suit and Rank | 2000 | 4000 | 6000 | 8000 | 10000 |
| Super Straight Flush (9-Card) | 1000 | 2000 | 3000 | 4000 | 5000 |
| Letter L Pattern | 1000 | 2000 | 3000 | 4000 | 5000 |
| Letter X Pattern | 1000 | 2000 | 3000 | 4000 | 5000 |
| Smiley Face Pattern | 1000 | 2000 | 3000 | 4000 | 5000 |
| Super Kind (Nine-of-a-Kind) | 900 | 1800 | 2700 | 3600 | 4500 |
| Super Kind (Eight-of-a-Kind) | 800 | 1600 | 2400 | 3200 | 4000 |
| Super Kind (Seven-of-a-Kind) | 700 | 1400 | 2100 | 2800 | 3500 |
| Super House (15-of-a-Kind, 10-of-a-Kind) | 500 | 1000 | 1500 | 2000 | 2500 |
| Super Flush (12 Cards) | 400 | 800 | 1200 | 1600 | 2000 |
| Super Flush (7 to 11 Cards) | 300 | 600 | 900 | 1200 | 1500 |
| Super Color Flush (20 Cards) | 200 | 400 | 600 | 800 | 1000 |
| Super Odds (20 Cards) | 200 | 400 | 600 | 800 | 1000 |
| Super Evens (20 Cards) | 200 | 400 | 600 | 800 | 1000 |
| Super Straight (10 Cards) | 100 | 200 | 300 | 400 | 500 |
| Scatter Royal Flush | 50 | 100 | 150 | 200 | 250 |
| Super Pair (5 Pairs) | 25 | 50 | 75 | 100 | 125 |

FIG. 5F

712

| SCATTER AWARDS | |
|---|---|
| Triple Natural Royal Flush | World Cruise for Two |
| Triple Scatter Royal Flush | Ford Mustang or Ford Explorer |
| Double Natural Royal Flush | Grand Piano or Autographed Guitar |
| Double Scatter Royal Flush | Weekend Getaway or Big Screen TV |
| Five Wild Cards | $500 Comp Dollars or Spin the Wheel |
| Seven Same Suit and Rank | Bowling Extravaganza or Golf Package |
| Super Straight Flush (9-Card) | Overnight Accommodations for Two |
| Plus Sign Pattern | $500 Comp Dollars or Spin the Wheel |
| House Pattern | Bowling Extravaganza or Golf Package |
| Dollar Sign Pattern | Overnight Accommodations for Two |
| Super Kind (Nine-of-a-Kind) | Mystery Prize or Video Camera |
| Super Kind (Eight-of-a-Kind) | Show Tickets or Concert Tickets |
| Super Kind (Seven-of-a-Kind) | $100 Promotional Money or Spa Treatment |
| Super House (15-of-a-Kind, 10-of-a-Kind) | Steakhouse Restaurant |
| Super Flush (12 Cards) | Jacket or $50 Gift Shop Coupon |
| Super Flush (7 to 11 Cards) | Buffet for Two or $25 Fun Money |
| Super Color Flush (20 Cards) | Tee Shirt or Baseball Hat |
| Super Odds (20 Cards) | Tee Shirt or Baseball Hat |
| Super Evens (20 Cards) | Tee Shirt or Baseball Hat |
| Super Straight (10 Cards) | 100 Points or Two Movie Tickets |
| Scatter Royal Flush | 50 Points or Souvenir Glass |
| Super Pair (5 Pairs) | Key Chain |

FIG. 5G

CARD GAME METHODS AND COMPUTER-READABLE MEDIUM FOR A CARD GAME INCORPORATING SCATTER AWARDS

CROSS REFERENCE TO RELATED APPLICATION

This application is a continuation of U.S. patent application Ser. No. 12/257,034, filed Oct. 23, 2008, and entitled "Card Game Methods And Systems," which is expressly incorporated herein by reference in its entirety.

TECHNICAL FIELD

The present methods relate to traditional and electronic card games. In particular, the present methods relate to card games that determine awards, win indicia, or payouts in a "scattered" method. The card combinations that produce an award, win indicia, or payout are determined by one or more cards and/or one or more symbols in one or more hands derived from one or more decks. Payouts for card combinations may be dictated by one or more pay tables or by another means of reward.

BACKGROUND

Traditional card games and video wagering games are popular entertainment, especially video poker. In these games a player makes a wager and is given a set of cards. In some games, such as video poker, the player can choose to keep or discard selected cards from the display. Replacement cards are awarded for the cards that the player has chosen to discard. The resulting hand or hands is matched against a pay table and payouts are awarded accordingly. Some games reward players with prizes or other nonpaying awards. In many contemporary games, a player can play multiple hands of various game types. For example, a video poker machine may display multiple hands of poker to a player. The player may chose to keep or discard cards from each of the multiple hands. Playing multiple hands may increase the excitement experienced by the user because the likelihood that the player wins a reward may be increased.

The video gaming industry has long sought to increase the excitement experienced by the player. An example of this desire may be evidenced by the ability to play multiple poker hands on a video poker machine. However, the video gaming industry has failed to provide payout methods that increase the player's excitement. As a result, benefits may be realized by providing improved payout methods in order to enhance the experience and excitement of the player.

BRIEF DESCRIPTION OF THE DRAWINGS

The preferred and other embodiments are shown in the accompanying drawings in which:

FIG. 5A illustrates one example of a pay table for hand pays of a scatter poker game.

FIG. 5B illustrates another example of a pay table for scatter pays of a scatter poker game.

FIG. 5C illustrates a further example of a pay table for scatter pays of a scatter poker game.

FIG. 5D illustrates an additional example of a pay table for scatter pays of scatter poker games.

FIG. 5E illustrates an example of a pay table for special symbol scatter pays of scatter poker games.

FIG. 5F is one embodiment of a pay table illustrating nontraditional combination scatter pays of scatter poker games.

FIG. 5G is one example of a pay table illustrating scatter awards for nontraditional combinations of scatter poker games.

SUMMARY

Figure 1:
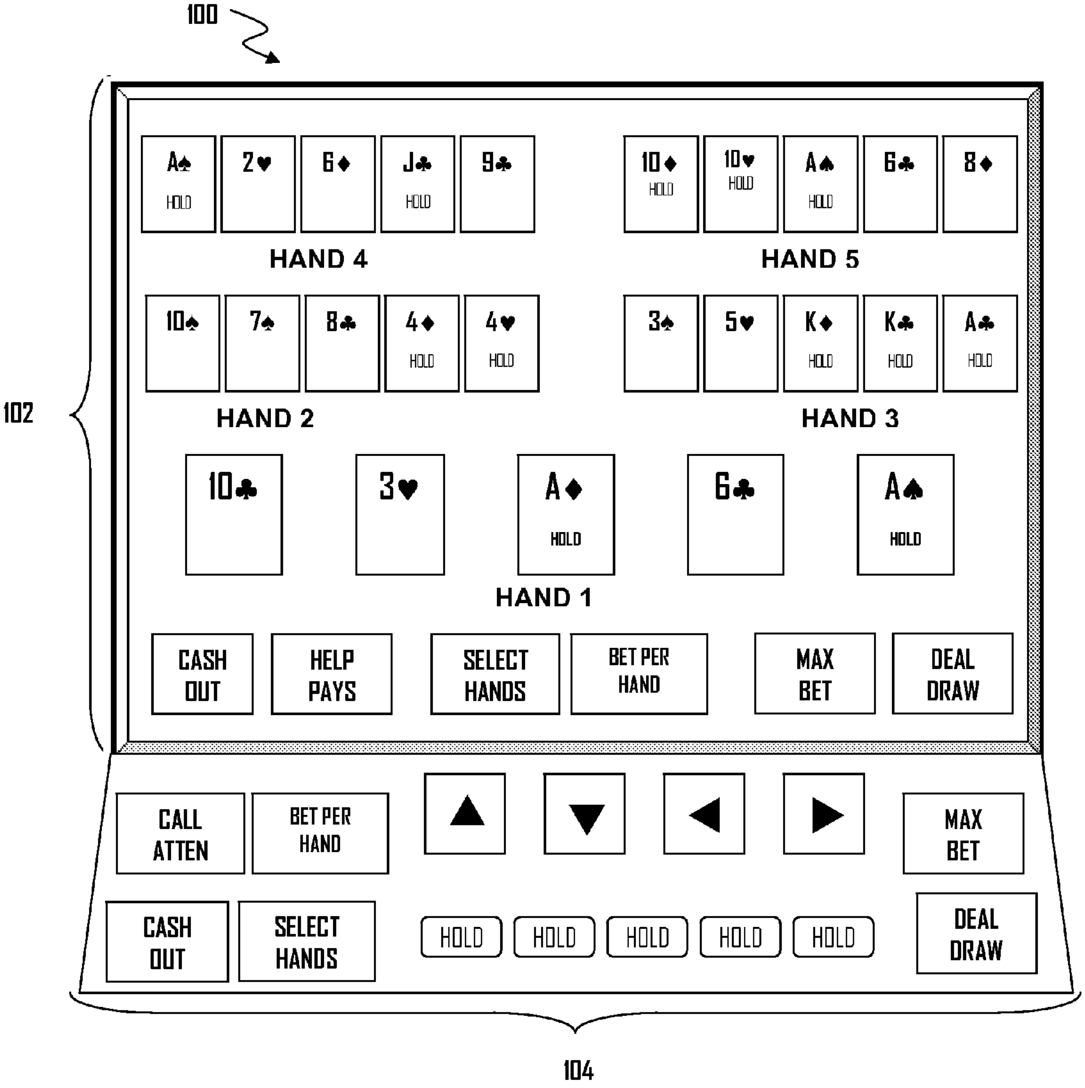
FIG. 1 illustrates one embodiment of a gaming machine with a five-hand poker game using a button deck.

A method for providing a payout based on a scattered combination of game cards is disclosed. More than one hand of cards is displayed. Each hand of cards includes one or more card positions. A card is placed in each of the one or more card positions. Characteristics associated with each card in the each hand of cards are analyzed. At least one card in a first card position in a first hand of cards is combined with at least one card in any card position in at least one hand of cards that is not the first hand of cards. A determination is made that a winning combination of cards is formed based on the characteristics associated with each card that is combined. A payout award is provided based on the winning combination of cards from within the plurality of hands of cards.

In some embodiments, the characteristics associated with each card comprise a card rank and a card suit. In certain embodiments, the characteristics associated with each card comprise a wild card characteristic. In certain embodiments, the characteristics associated with each card comprise a symbol.

A determination may be made as to whether a specific pattern is formed by the combined cards. In some embodiments, a payout award may be provided based on the specific pattern formed by the combined cards.

The cards for each hand of cards may be provided from a different deck of cards. The combination of cards may be compared to combinations of cards provided in a payout table.

A video card game system configured to provide a payout based on a scattered combination of cards is also disclosed. The video card game system includes a processor and memory in electronic communication with the processor. Instructions are stored in the memory. The instructions are executable to display more than one hand of cards. Each hand of cards includes one or more card positions. A card is placed in each of the one or more card positions. The instructions are also executable to analyze characteristics associated with each card in the each hand of cards. In addition, the instructions are executable to combine at least one card in a first card position in a first hand of cards with at least one card in any card position in at least one hand of cards that is not the first hand of cards. Further, the instructions are executable to determine a winning combination of cards is formed based on the characteristics associated with each card that is combined, and provide a payout award based on the winning combination of cards.

A computer-readable medium including executable instructions is also disclosed. The instructions are executable to display more than one hand of cards. Each hand of cards includes one or more card positions. A card is placed in each of the one or more card positions. The instructions are also executable to analyze characteristics associated with each card in the each hand of cards. In addition, the instructions are executable to combine at least one card in a first card position in a first hand of cards with at least one card in any card position in at least one hand of cards that is not the first hand of cards. Further, the instructions are executable to determine a winning combination of cards is formed based on the characteristics associated with each card that is combined, and provide a payout award based on the winning combination of cards.

A method for determining a payout for a card game is also described. One or more hands of cards may be displayed. Each hand of cards may include at least one or more card positions. A card may be placed in each of the hand of cards in at least one or more card positions. Characteristics associated with each card in the each displayed hand of cards may be analyzed. At least a first card in a first card position may be combined with at least a second card in the second card position. A determination may be made as to whether a winning combination of cards is formed by at least the first and second cards. If a winning combination is formed, a payout award based on the winning combination of cards may be provided.

It is to be understood that this Summary recites certain aspects and advantages of some embodiments of the present invention. Additional aspects, advantages, and other features of these and other embodiments will become apparent as this Specification proceeds. In this regard, it is to be understood that the scope of the invention is to be determined by reference to the claims as issued and not by whether any given feature or aspect is set forth in this Summary or by whether given subject matter addresses any issues identified in the Background set forth above.

DETAILED DESCRIPTION

Payouts for conventional and video card games are traditionally determined by preset pay lines or configurations. The payouts provided by the present methods may enhance the experience of a player that is playing the card game.

The present payout methods can provide a player with an improved or differing playing experience by using one or more card hands with one or more card decks. The present payout methods are unlike the method of U.S. Pat. No. 5,042,818, in which a multi-deck poker game allows an additional card or cards to be dealt to from a single hand of six or more cards. The present payout methods are also unlike the method of U.S. Pat. No. 5,803,809, which uses multiple separate decks where each card position is dealt from a predetermined deck of cards to form only a single hand. Another method that pays according to a single hand is disclosed in U.S. Pat. No. 5,816,916; in that method, cards from the initial deal of five cards that match in card rank are grouped together and stacked on top of each other. Replacement cards are then dealt from a single, standard deck and the final hand uses poker hand rankings to determine winning hand combinations.

The present payout methods utilize "scattered" cards or symbols from among a plurality of hands to provide one or more winning combinations. This is unlike the method of U.S. Pat. No. 6,322,445, in which winning combinations of poker hands are determined for the pay lines contained in the game array. Other methods that utilize pay lines to provide winning combinations are disclosed in: U.S. Pat. No. 4,700,948, U.S. Pat. No. 6,976,917, U.S. Pat. No. 6,220,959, and U.S. Pat. No. 7,007,953.

The present payout methods also are unlike the method of U.S. Pat. No. 5,531,440. In that method, the player is dealt two distinct hands from separate decks of cards and pays are awarded for cards in the first hand matching one or more cards in the second hand. The method described in U.S. Pat. No. 5,531,440 only pays on the initial draw for matching suit and rank. Then, one of the hands disappears and no more pays are available for that hand. Cards are not combined from both hands for traditional poker pays or other award types.

The present payout methods are also unlike the method of U.S. Pat. No. 6,334,613. In that method, a partial hand is provided to a player after an initial wager and the actual hand of poker involves the potential for at least two distinct games of poker being playable from that partial hand. The player may select to play one or more of the potential games from at least two distinct game types. This method permits multiple game types in multiple hands, but cards are not combined from both hands for traditional poker pays or other award types.

The present payout methods also are unlike the method of U.S. Pat. No. 6,561,898. In that method, the player is initially dealt multiple, partial five-card, stud poker hands. Each initial hand has the same cards with the cards displayed face-up. Each hand is then completed by dealing its own additional cards, and the player wins or loses depending on the poker hand ranking of each final hand. No multi-hand combination pays exist.

Further, the present payout methods also are unlike the method of U.S. Pat. No. 5,732,950. In that method, the player attempts to achieve a high-ranking poker hand on the center row by using face-up and face-down cards as potential replacement cards for the five cards initially dealt to the center row. An alternative method, set forth in U.S. Pat. No. 5,732,950, involves permitting the player to play up to three hands of video poker at the same time, but each row is treated as a separate hand for payout purposes. No multi-hand combination payouts or awards exist.

The present payout methods also are unlike the methods of U.S. Pat. No. 5,823,873, U.S. Pat. No. 6,007,066, U.S. Pat. No. 6,955,356, and U.S. Pat. No. 7,222,857. In these patents, the player holds one or more face-up cards which are duplicated from the first row into all the other rows. The present payout methods allow auto-holding of multiple hands, and allow individual holding of multiple hands, but the present payout methods do not select cards from a first hand as cards to be held which are reused from the first hand into all the other hands.

In some embodiments, the proposed payout methods can introduce an element of surprise to the existing card games by determining card and symbol combinations that were previously not considered in card games. Further, the proposed payout methods can, if desired, allow for more winning combinations than the typical pay line systems by using scattered cards and symbols from one or more hands to combine for further winning arrangements beyond traditional poker combinations.

In certain embodiments, the present payout methods determine payouts and awards for traditional card games and electronic gaming devices. In one example, a player may be dealt from 1 to N hands of cards with 1 to M cards in each hand. These hands may correspond to various types of poker games such as draw poker, stud poker, Caribbean Stud, Blackjack, Texas Hold'em, Omaha, Let It Ride and other card games which the player can play simultaneously.

Some games employ one or more holding and/or discarding stages with subsequent replacement cards before the final hands are reached. These final cards may then be matched against winning combinations in a pay table and awards (e.g., monetary awards, credits, etc.) may be awarded to the player accordingly. Awards may also occur during game play and not just when the final hands are established. Additional betting stages may occur during game play. In one embodiment, awards and payouts may be nonmonetary.

Instead of using set pay lines, as in most traditional multi-hand poker games, the present methods use a "scatter" method whereby the cards in a plurality of card hands or sets may be evaluated for applicability to a winning combination or combinations. In one embodiment, determinations of winning combinations may be accomplished by traditional poker hand rankings, by more complex poker hand rankings, or by using a special symbol or symbols on the cards to form unique combinations. In at least some embodiments, this can allow the player to enjoy potential wins and awards outside the traditional pay line method and increases the number of available winning combinations.

In at least some embodiments, payout and reward methods can incorporate a single-hand or multi-hand card game which can, if desired, add scatter pays to traditional card games. In some embodiments, the scatter pays may be applied to many different types of games including draw poker, stud poker, Caribbean Stud, blackjack, Texas Hold'em, Omaha, Let It Ride, and other card games. Multi-hand games may have different game type hands. For example, a game may employ a draw poker hand or hands and stud poker hand or hands.

Scatter pay combinations may be determined by using card ranks and card suits and/or by using special symbols. Scatter payouts may occur from similar hand wins (e.g., two or more hands each having a royal flush), or scatter payouts may occur from hands combining to make a win (e.g., two or more hands combining to make one or more royal flushes). The present payout methods may be applied to hands with 1 to N cards. Some scatter payout examples for five-card hands may include:

1. Royal Flush: Similar hand wins may pay and/or one or more occurrences across multiple hands may pay. For example, a four-hand game might pay for a double royal flush.
2. Straight Flush: Similar hand wins may pay and/or one or more occurrences across multiple hands may pay. For example, a nine-hand game could pay for three straight flushes.
3. Four-of-a-Kind: Similar hand wins may pay and/or one or more occurrences across multiple hands may pay. For example, a two-hand game may pay for a two four-of-a-kind.
4. Full House Similar hand wins may pay and/or one or more occurrences across multiple hands may pay. For example, a seven-hand game might pay for three full houses, two full houses, and one full house.
5. Flush: Similar hand wins may pay and/or one or more occurrences across multiple hands may pay. For example, a ten-hand game might pay for three single-hand flushes.
6. Straight: Similar hand wins may pay and/or one or more occurrences across multiple hands may pay. For example, a three-hand game might pay for three straights, two straights, and one straight.
7. Three-of-a-Kind: Similar hand wins may pay and/or one or more occurrences across multiple hands may pay. For example, a fifteen-hand game might pay for five single-hand three-of-a-kinds.
8. Two Pair: Similar hand wins may pay and/or one or more occurrences across multiple hands may pay. For example, a four-hand game might pay for four single-hand pairs.
9. Jacks or Better: Similar hand wins may pay and/or one or more occurrences across multiple hands may pay. For example, a nine-hand game might pay for six or more single-hand jacks or better.
10. Wild Cards: Similar hand wins may pay and/or one or more occurrences across multiple hands may pay. For example, a seven-hand game might pay for seven single-hand wild cards. In addition, a payout may occur for seven total wild cards. Further, a payout may occur by using all seven wild cards to substitute for seven ace-of-spades or another type of scatter pay.
11. Same Rank and Suit: Cards of the same rank and suit across multiple hands may pay. For example, a five-hand game may pay for five ace-of-spades, a ten-hand game may pay for seven jack-of-hearts, or a seven-hand game may pay for three two-of-diamonds, etc.
12. Super Royal Flush: Royal flushes of more than five cards across multiple hands may pay. For example, a seven-hand game might pay for a royal flush of all thirteen cards in a suit.
13. Super Straight Flush: Straight flushes of more than five cards across multiple hands may pay. For example, a seven-hand game might pay for a straight flush of ten cards in a suit.
14. Super Kind: Cards of matching rank across multiple hands may pay. For example, a nine-hand game might pay for twenty-five or more queen cards.
15. Super House: Cards of two houses across multiple hands may pay. For example, a six-hand game might pay for fifteen kings and ten queens.
16. Super Flush: Flush cards across multiple hands may pay. For example, three-hand game might pay for ten or more heart cards.
17. Super Color Flush: Flush cards of the same color across multiple hands may pay. For example, a ten-hand game might pay for thirty or more red cards.
18. Super Odds and Super Evens: Odd cards or even cards across multiple hands may pay. For example, a seven-hand game might pay for twenty or more even cards. Or, a five-hand game might pay for all odd cards and no even cards.
19. Super Straight: Straights of more than five cards across multiple hands may pay. For example, a four-hand game might pay for a straight of ten or more cards.

20. Super Pair: Pairs across multiple hands may pay. For example, a five-hand game might pay for any ten pairs, and a fifteen-hand game might pay for all thirteen unique pairs.
21. Special Symbol: A special symbol or symbols (like a colored star) may be added to some or all of the cards. Pays may be determined by number of stars, number of colored stars, number of matching colored stars, etc. Multiple symbols (like suns, stars, moons and others) may be applied to increase the payout possibility.
22. Pattern: Cards across a single hand or multiple hands may pay when a specific pattern is matched. For instance, a letter L, a letter X, a house, a smiley face, or other pattern might pay.

In some embodiments, a scatter pay game utilizing the present payout methods may be a standalone game, a progressive and/or multilevel progressive (internal and linked) game, a tournament game, a group game, etc. The game may be played on a traditional casino card table, a video gaming machine, a video terminal, over the Internet, on a television, or on other gaming devices. One or more wild cards may be employed in the scatter pay game.

FIG. 1 illustrates one embodiment of a video game system 100 that may implement the present methods. In one example, the system 100 is a gaming machine. The machine may include a screen 102 that displays several hands of cards. In one embodiment, the hands of cards may be used to play five-hand poker game. A player may navigate the cards displayed on the screen 102 using a button deck 104. Details regarding the various buttons, card layouts, etc. will be described below.

Figure 3:
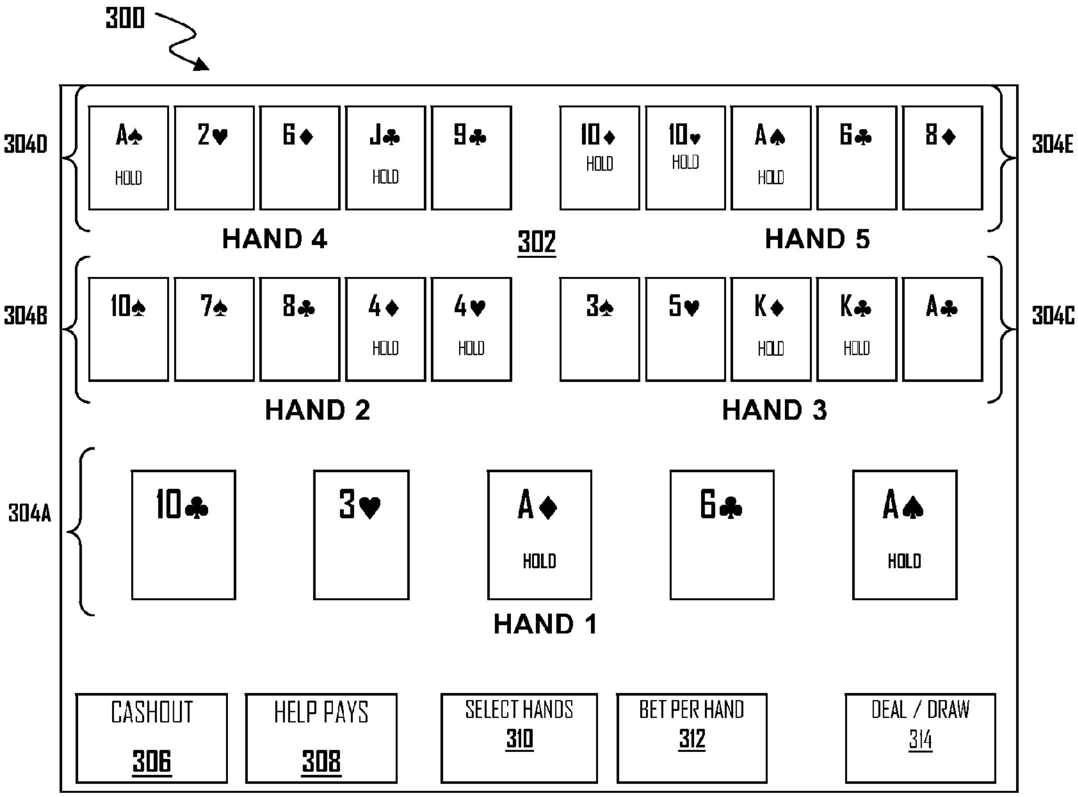
FIG. 3 illustrates one embodiment of a screen display for a standalone application of a five-hand draw poker scatter game with no additional special symbols.

FIG. 3 illustrates one example of a standalone five-hand draw poker video progressive game 300 that may use the payout scatter methods described herein. In one embodiment, a main screen 302 includes five, five-card hands 304A, 304B, 304C, 304D, 304E, which are dealt and drawn by the player. In one configuration, no added special symbols are employed in this game. Betting may occur at the start of the game or at various intervals throughout the game.

In one embodiment, a payout is awarded for five cards of the same suit and rank scattered across the five hands. For example, five ace-of-spades is the top scatter award, and five two-of-clubs is the lowest paying scatter award.

The game may employ meters such as the cash/credit meter, select hands meter, bet per hand meter, total bet meter, the win/paid meter, and the optional progressive meter(s). Interactive buttons may also be employed such as: a cashout button 306, a call attendant button (not shown), a pays button 308 (which may be combined with a help button 308), a language button (not shown), a denomination button (not shown), a select hands button 310, a bet per hand button 312, a bet max button (not shown), and a deal/draw button 314.

Figure 9A:
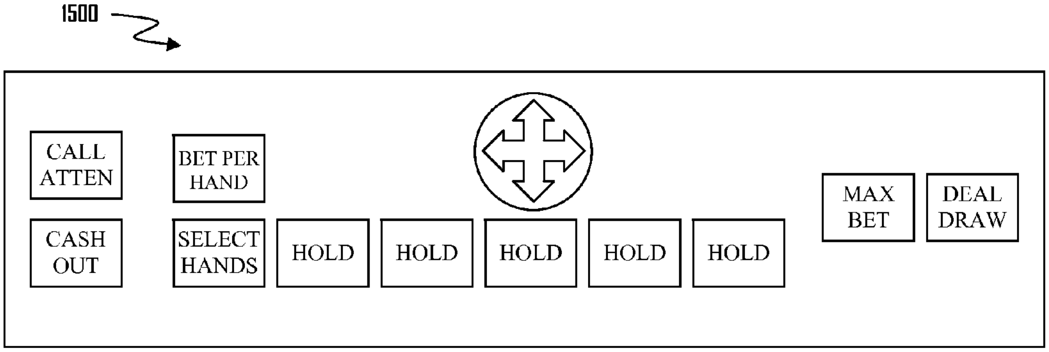
FIG. 9A illustrates one embodiment of a 12-button deck configuration for input commands.
Figure 9B:
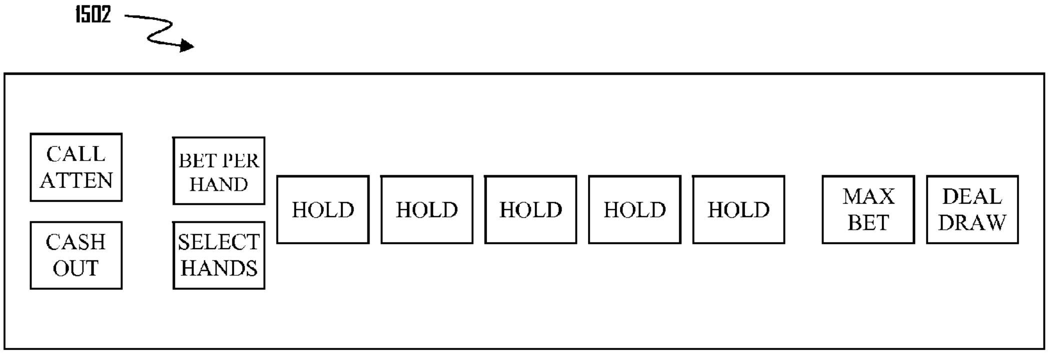
FIG. 9B illustrates one configuration of an 11-button deck configuration for input commands.
Figure 9C:
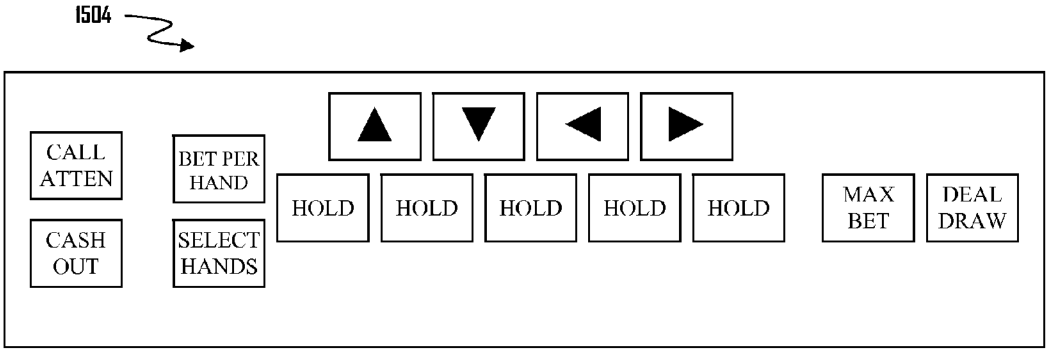
FIG. 9C illustrates one example a 15-button deck configuration for input commands.

Additionally, the game may employ a method to hold/discard cards in the one or more hands through buttons 1500, 1502, 1504 illustrated in FIGS. 9A, 9B, 9C. Further, the player may select which cards to hold/discard via touch-screen, such as the main screen 302. The game screen 302 may include hand markers to indicate which hands are active, and the game may include pay indicators for traditional hand pays and scatter pays.

Returning to FIG. 3, the player may play from one to five hands 304A, 304B, 304C, 304D, 304E and may bet from one to five coins per hand. All five hands 304A, 304B, 304C, 304D, 304E may be dealt from different decks. Secondary hands 304B, 304C, 304D, 304E may utilize an auto-hold feature to speed up play. In one embodiment, the player may override the auto-hold.

Figure 2:
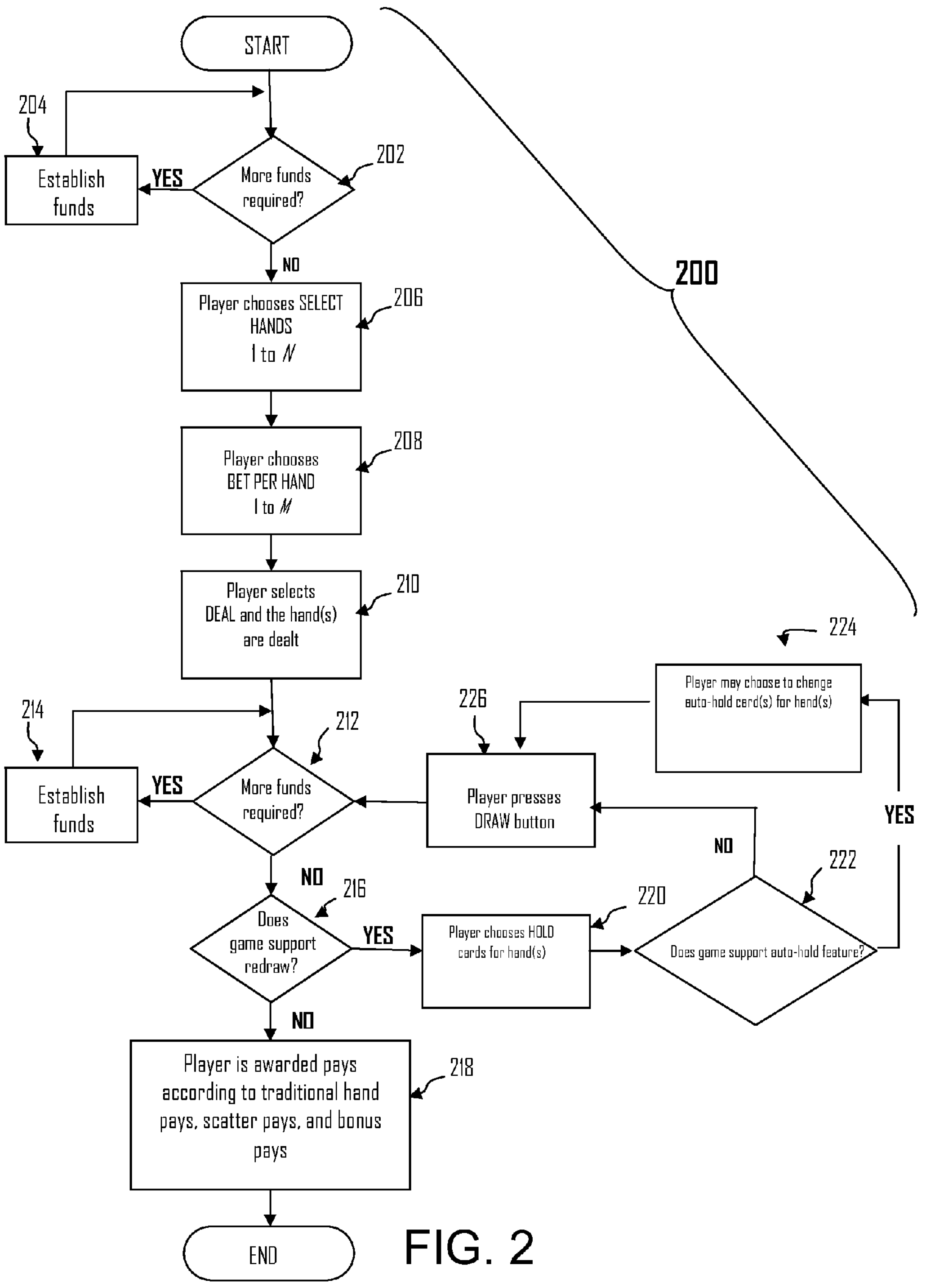
FIG. 2 is a flow diagram illustrating one embodiment of a method for game play.

FIG. 2 is a flow diagram illustrating one embodiment of a method 200 for playing the game illustrated in FIG. 3. A first determination 202 may be made as to whether additional funds are required. If it is determined 202 that more funds are required, the funds may be established 204. For example, a player may insert additional monies into a video card game machine. If it is determined 202 that additional funds are not required, the player may choose 206 the number of hands he/she will play. The player may choose 206 the number of hands to play by using the select hands button 310. In one embodiment, the player may choose 206 to play one hand up to N hands. For example, the player may choose 206 to play up to five hands.

In addition, the player may choose 208 how much to bet on each hand. The player may make this choice by using the bet per hand button 312. In one example, the player may choose 208 how many credits (from 1 to M) to bet on each hand. The player may then select 210 the deal/draw button 214 and the selected number of hands may be dealt to the player.

A second determination 212 may be made as to whether additional funds are required for the game to proceed. If it is determined 212 that more funds are required, the additional funds may be established 214. For example, the player may insert more coins into the video card game machine. If no additional funds are required, a third determination 216 may be made as to whether the game supports a redraw functionality. If it is determined 216 that the game supports redraw functionality, the player may choose 220 which cards (from the cards previously dealt to the player) to hold. For example, the player may evaluate each card in each of the hands dealt to the player and choose 220 which cards to hold.

In an embodiment, a fourth determination 222 may be made as to whether or not the game supports an auto-hold feature. If the game does support the auto-hold feature, cards may be automatically held based on certain algorithms or settings of the game. The player may choose 224 to de-select cards that are automatically held. In addition, the player may choose 224 to select cards that are not automatically held. After the player has the opportunity to change cards that are/are not automatically held, or if it is determined 222 that the game does not support the auto-hold feature, the player may press 226 the deal/drawn button 314. Cards that were not held may be replaced by newly dealt cards.

The second determination 212 may be made as to whether additional funds are required for the game to proceed. If it is determined 212 that more funds are required, the additional funds may be established 214. If no additional funds are required, the third determination 216 may be made as to whether the game supports redraw functionality. If it is determined 216 that the game supports a redraw functionality, the player may choose 220 which cards (from the cards previously dealt to the player) to hold, as previously explained.

If it is determined 216 that the game does not support the redraw functionality, the player may be awarded 218 a payout according to a certain payout structure. For example, the payout method may be based on a traditional hand payout method, a scattering payout method, a bonus payout method, etc. Details regarding the scattering payout method will be discussed below.

Figure 4:
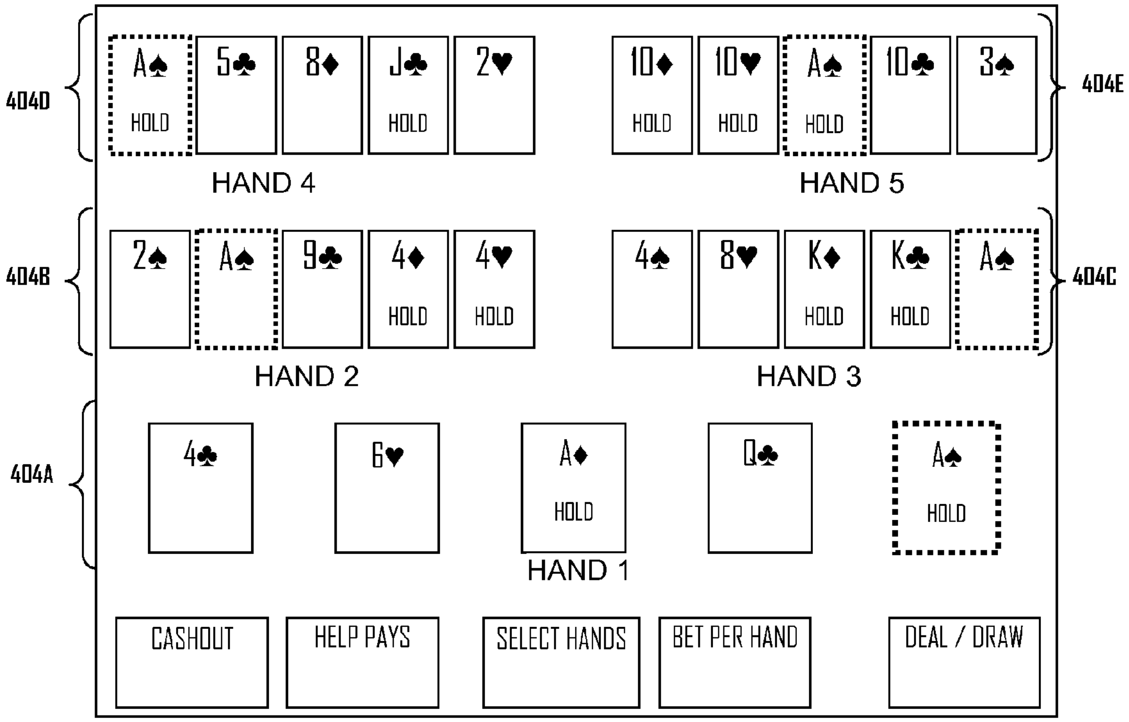
FIG. 4 is one embodiment of the screen display for FIG. 3 after a possible player redraw.

FIG. 4 illustrates one embodiment of a plurality of card hands 404A, 404B, 404C, 404D, 404E, at the conclusion of a game. In some embodiments, the card hands yield multiple wins. For example, a first hand of cards 404A may pay for a pair of jacks or better. A third hand of cards 404C may pay for a pair of jacks or better. A fifth hand of cards 404E may pay for a three-of-a-kind. A second hand of cards 404B and a fourth hand of cards 404D may not pay based on the cards in these hands.

In some embodiments, a scatter payout, according to the present methods, may payout for a five-of-same-suit-and-rank combination. For example, the ace-of-spades appears once in each of the hands of cards 404A, 404B, 404C, 404D, 404E. As a result, according to the scattering payout method, the player also has a winning combination of five ace-of-spades which are scattered across each of the hands of cards.

The plurality-of-hand card game illustrated in FIG. 4 may use several pay tables. FIGS. 5A, 5B, 5C, 5D, 5E, 5F, and 5G are embodiments of sample hand pay tables 700, 702, 704, 706, 708, 710, 712 that may be used with the card game illustrated in FIG. 4. For example, a hand payout table 700 includes payouts associated with each hand. For example, if two hands include a "royal flush" with a bet per hand of 5, the player may win a payout of 8000 according to the hand payout table 700.

A first scatter payout table 702 may include payouts associated with combinations of cards scattered across the plurality of hands played by the player. For example, if there are five "same suit and rank" cards scattered across the hands, a payout of 100 may be awarded to the player with a bet per hand of 1. If there is a second occurrence of five "same suit and rank" cards scattered across the hands, a payout of 200 may be awarded to the player or an additional scatter multiplier may be applied to multiple similar wins.

A second scatter payout table 704 may also be used to award payouts to a player. For example, if a "nine or more of a kind" combination is scattered across the card hands, a payout of 1000 may be awarded. The payout may increase linearly or nonlinearly if more than one occurrence of the "nine or more of a kind" combination is scattered across the multiple card hands.

A third scatter payout table 706 may also be used to award payouts based on symbols. For example, cards used in the game may include a symbol and a certain number of symbols scattered across the various card hands may result in a payout. In addition, a fourth scatter payout table 708 may be used as illustrated in FIG. 5E.

The card game illustrated in FIG. 4 may optionally employ a wild card or wild cards in one or more hands. The wild card or cards may substitute for cards in the same hand or other hands as deemed by the pay table. Scatter wild cards may also be a separate payout as indicated by the pay tables 702, 704, 706, 708, 710, 712.

Figure 6:
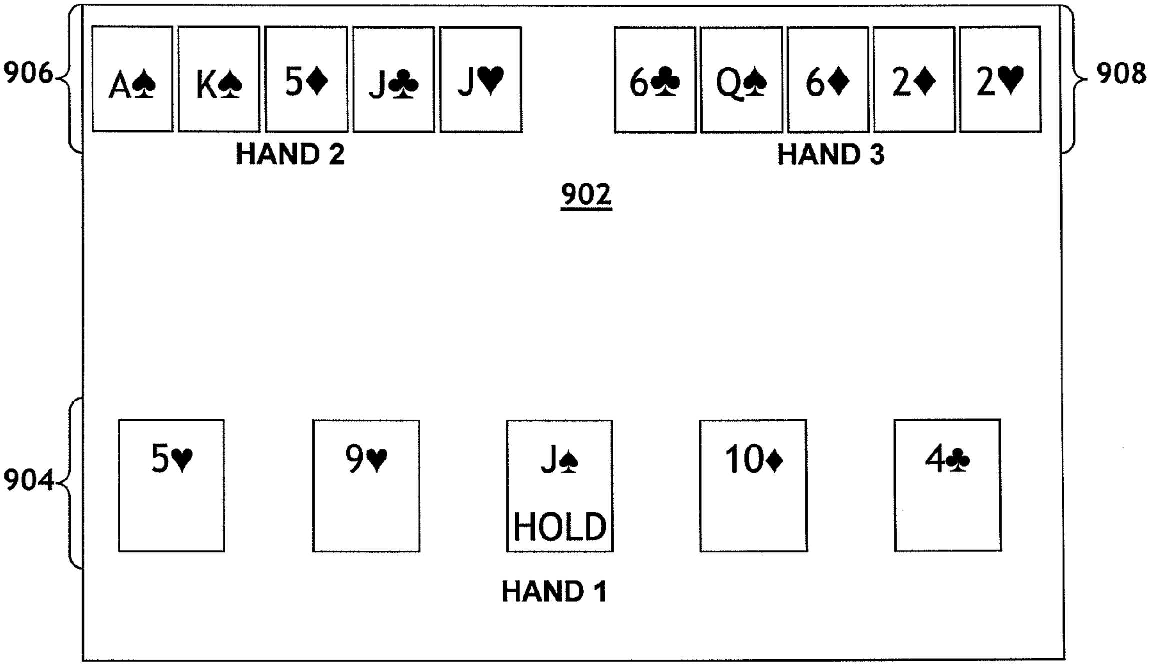
FIG. 6 illustrates one embodiment of a screen display for a standalone application of a three-hand stud poker and draw poker scatter game with no additional special symbols.

In another embodiment, the present payout methods may be applied to a tournament three-hand (two stud hand and one draw poker hand) video game as illustrated in FIG. 6. A main screen 902 may include three 902, 904, 906, five-card hands where the top two hands 906, 908 are the stud hands, and the bottom hand 902 is the draw poker hand. In one embodiment, no added special symbols are employed in this game. Tournament style play may be used where the players have a play limit to accumulate points, credits, cash or some other result determining method. This version of the game may include scatter payouts for four-of-a-kinds through twelve-of-a-kinds. For example, nine-or-more-of a-kind may be the top scatter award, and four-of-a-kind may be the lowest paying scatter award. Scatter awards of five-of-a-kind, six-of-a-kind, seven-of-a-kind, and eight-of-a kind may complete the scatter pay awards for this game.

In some embodiments as shown in FIG. 6, the game may employ standard or other meters such as the cash/credit meter, select hands meter, bet per hand meter, total bet meter, the win/paid meter, and the optional progressive meter(s). Standard or other buttons may also be employed such as: cashout; button, call attendant button, pays button, help button, language button, denomination button, select hands button, bet per hand button, bet max button, and a deal/draw button, as previously described.

With continuing reference to FIG. 6, some embodiments may allow a player to hold/discard cards through buttons. Exemplary button configurations are illustrated in FIGS. 9A, 9B, 9C. In addition, the player may hold/discard cards via a touchscreen, such as the main screen 102, 302, 902. The game screens 102, 302, 902 may include hand markers to indicate which hands are active, and the game may have pay indicators for traditional hand pays and scatter pays.

In certain exemplary games, such as that illustrated in FIG. 6, the player may play from one to three hands 902, 904, 906 and may bet from one to five coins per hand. In one embodiment, all three hands 902, 904, 906 are dealt from different decks. The second hand 904 and the third hand 906 may be stud hands. In other words, the player may not hold/discard cards in the second hand 904 and the third hand 906.

In certain embodiments, the player chooses the number of card hands he/she desires to play and placed a bet per hand. The player may press a deal button and the hand(s) are dealt. In some embodiments, the player may choose to hold cards for the first hand 902. The player may press a draw button and the first hand 902 may be drawn (if cards are held and/or discarded). In one configuration, the player is awarded payouts according to traditional pays and scatter pays in accordance with the present scatter payout methods.

Figure 7:
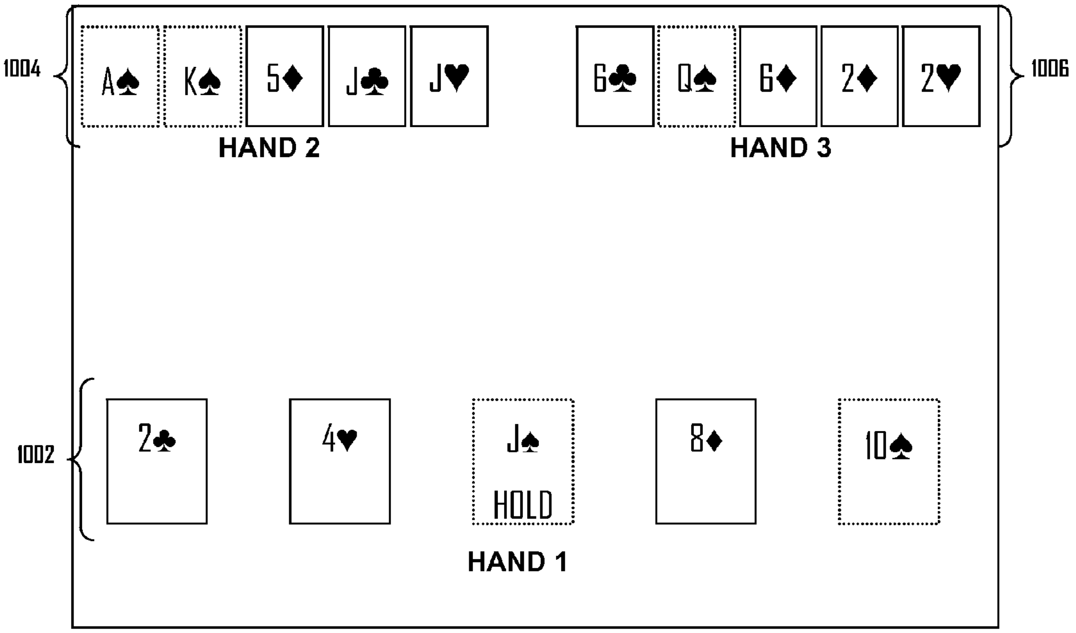
FIG. 7 illustrates the screen display of FIG. 6 after a possible player redraw, and the winning scatter pay is indicated by a dotted outline.

As shown in FIG. 7, after the draw, the player may have multiple wins: the second hand 1004 pays for a pair of jacks or better, and the third hand 1006 pays for two pair according to a traditional payout table, such as the hand pay table 702. The first hand 1002 may not include a winning combination. However, a combination across the three hands 1002, 1004, 1006 may award the player a payout. For example, a scatter payout may be awarded for a royal flush in spades that is scattered out across the three hands 1002, 1004, 1006.

Each of the payout tables previously described may be used to award a payout to the player. In addition, the game illustrated in FIGS. 6 and 7 may optionally include one or more wild cards in one or more hands. The wild card or cards would substitute for its own hand or other hands as deemed by the pay table. Scatter wild cards may also be a separate pay event if so deemed by the pay table for example.

Some embodiments of the game may employ standard meters such as the cash/credit meter, select hands meter, bet per hand meter, total bet meter, the win/paid meter, and the optional progressive meter(s). One or more standard or other buttons can also be employed, such as a cashout button, a call attendant button, a pays button, a help button, a language button, denomination button, a select hands button, a bet per hand button, a bet max button, and a deal/draw button. The game screen has hand markers to indicate, which hands are active, and the game has pay indicators for traditional hand pays and scatter pays.

Figure 8:
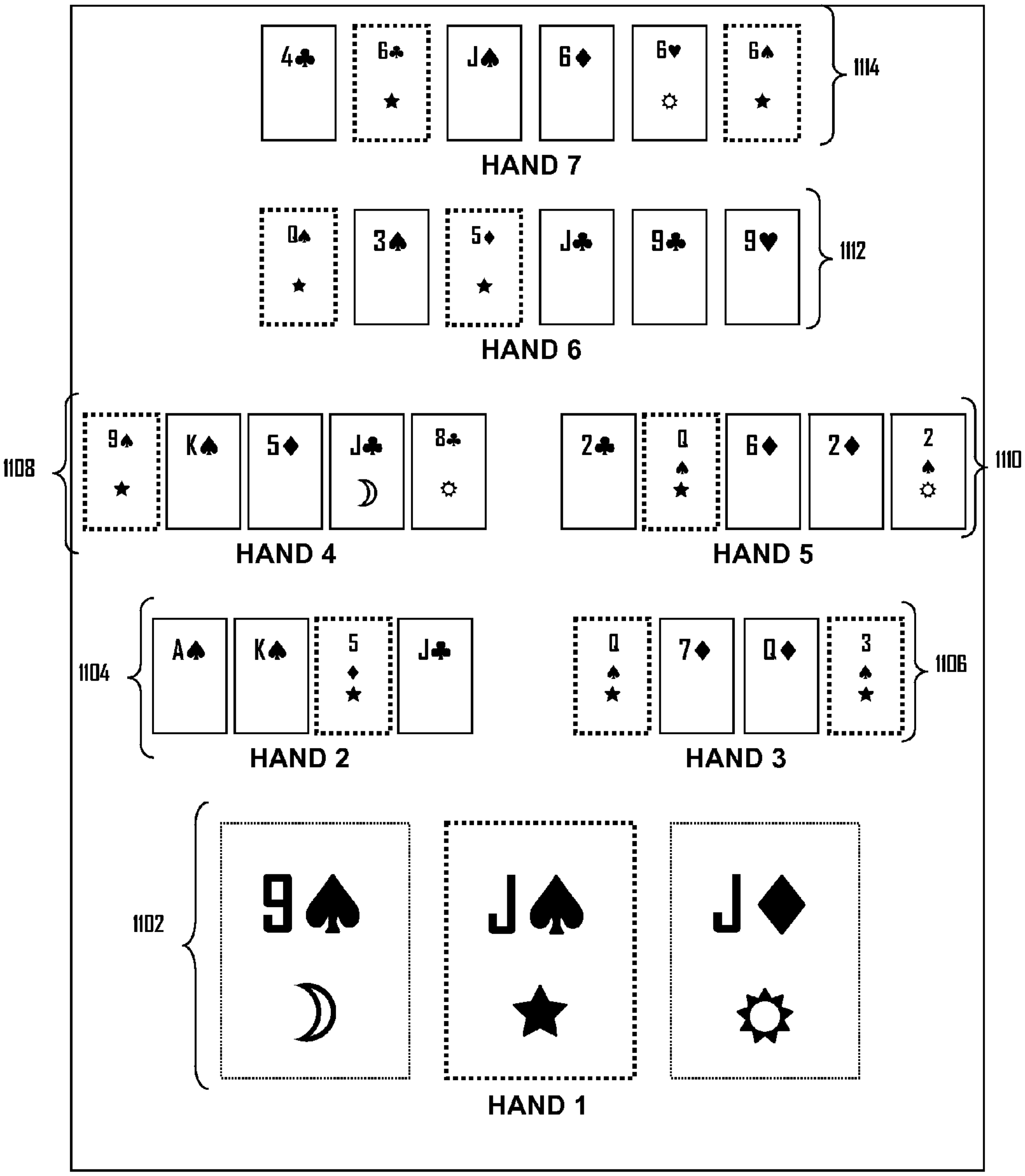
FIG. 8 illustrates one embodiment of a screen display for a standalone application of a seven-hand stud poker game with additional special symbols.

FIG. 8 illustrates another embodiment of a card game that uses the present scatter payout methods. In one embodiment, the player may play from one to seven hands 1102, 1104, 1106, 1108, 1110, 1112, 1114 and may bet from 1 to N coins per hand. The first hand 1102 may be dealt from a unique deck. The second and third hands 1104, 1106 may be dealt from a unique deck, the fourth and fifth hands 1108, 1110 may be dealt from a unique deck, and the sixth and seventh hands 1112, 1114 may be dealt from a unique deck.

In some embodiments, the player may choose the number of hands he/she would like to play and place a bet per hand.

The player may press the deal button as previously explained and the hand(s) may be dealt. In one embodiment, the player is awarded payouts according to traditional payouts and scatter payouts.

As shown in FIG. 8, the player can have multiple wins if desired. For example, the first hand 1102 and the third hand 1106 award a payout for a pair of jacks or better. The fifth hand 1110 may award a payout for a three-of-a-kind. The seventh hand 1114 may award a payout for a four-of-a-kind. According to a scattering payout method, a scatter payout may be awarded for ten-any-stars. As illustrated, ten star symbols are scattered across each of the hands 1102, 1104, 1106, 1108, 1110, 1112, 1114. One sample scatter payout table with symbols is illustrated in FIGS. 5D and 5E. The game illustrated in FIG. 8 may optionally employ a wild card or wild cards in one or more hands. The wild card or cards may substitute for its own hand or other hands as deemed by the pay table. Scatter wild cards may also be a separate pay as deemed by the pay table.

The three demonstration games are representative of the many applications of the scatter payout methods and how the method may be applied to 1 to N hands of cards with m cards in each hand, and 1 to P hand types such as draw poker, stud poker, Caribbean Stud, Blackjack, Texas Hold'em, Omaha, Let It Ride, and other card games. A plurality of hand and card combinations utilizing the scatter payout methods with a multitude of pay tables and awards is possible. FIG. 5F and FIG. 5G illustrate another embodiment of more sample scatter payouts and awards. As previously explained, one or more decks may be used to implement the payout and/or award methods described herein.

Figure 10:
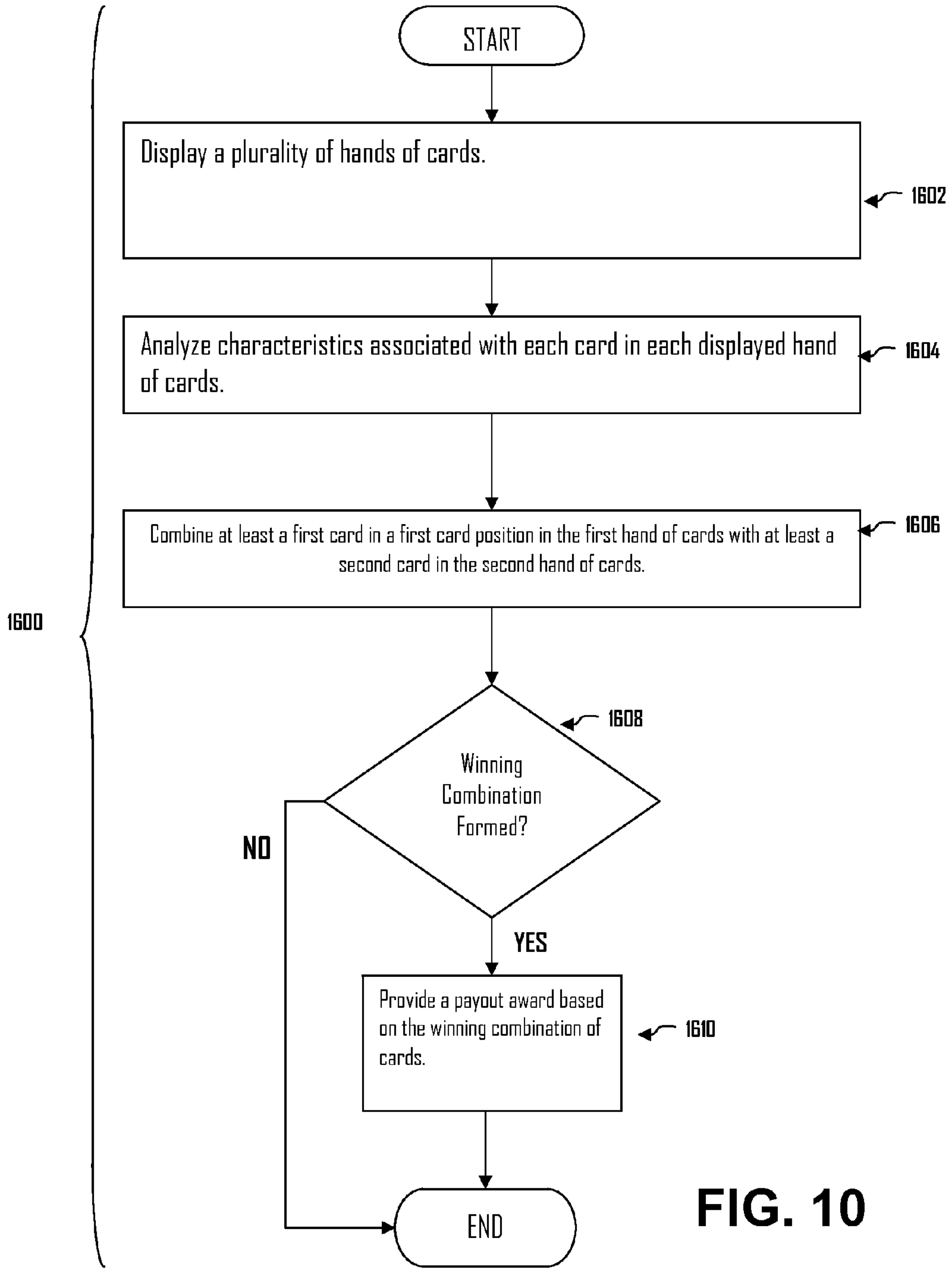
FIG. 10 is a flow diagram illustrating one embodiment of a method for awarding a payout according to a scattering combination.

FIG. 10 is a flow diagram illustrating one embodiment of a method 1600 for providing a payout award. In one embodiment, the payout may be based on a scattered combination of game cards. In another embodiment, the payout award may be based on a combination of wild cards, symbols, patterns, etc. In a further embodiment, the payout awards may be based on a combination of cards that are the same color. In addition, the payout awards may be based on the number of odd and/or even numbered cards in the combination of game cards.

In one embodiment, a plurality of hands or cards may be displayed 1602. Each displayed hand of cards may include more than one card position. In addition, a card may be placed in each of the one or more card positions.

In one embodiment, characteristics associated with each card in each hand of cards may be analyzed 1604. Characteristics may include a card rank, a card suit, a symbol, etc. In addition, the characteristics may indicate that a card is a wild card that may be substituted for another card. Other characteristics may include the color of a card, symbols on the card, patterns associated with the card, etc. In one example, at least a first card in a first card position in a first hand of cards may be combined 1606 with at least a second card in a second hand of cards.

In one configuration, a determination 1608 may be made as to whether or not a winning combination is formed by at least the first and second cards in the first and second hands of cards. If it is determined 1608 that a winning combination is formed, a payout award may be provided 1610 based on the winning combination. However, if it is determined 1608 that a winning combination is not formed, no payout award may be provided.

Figure 11:
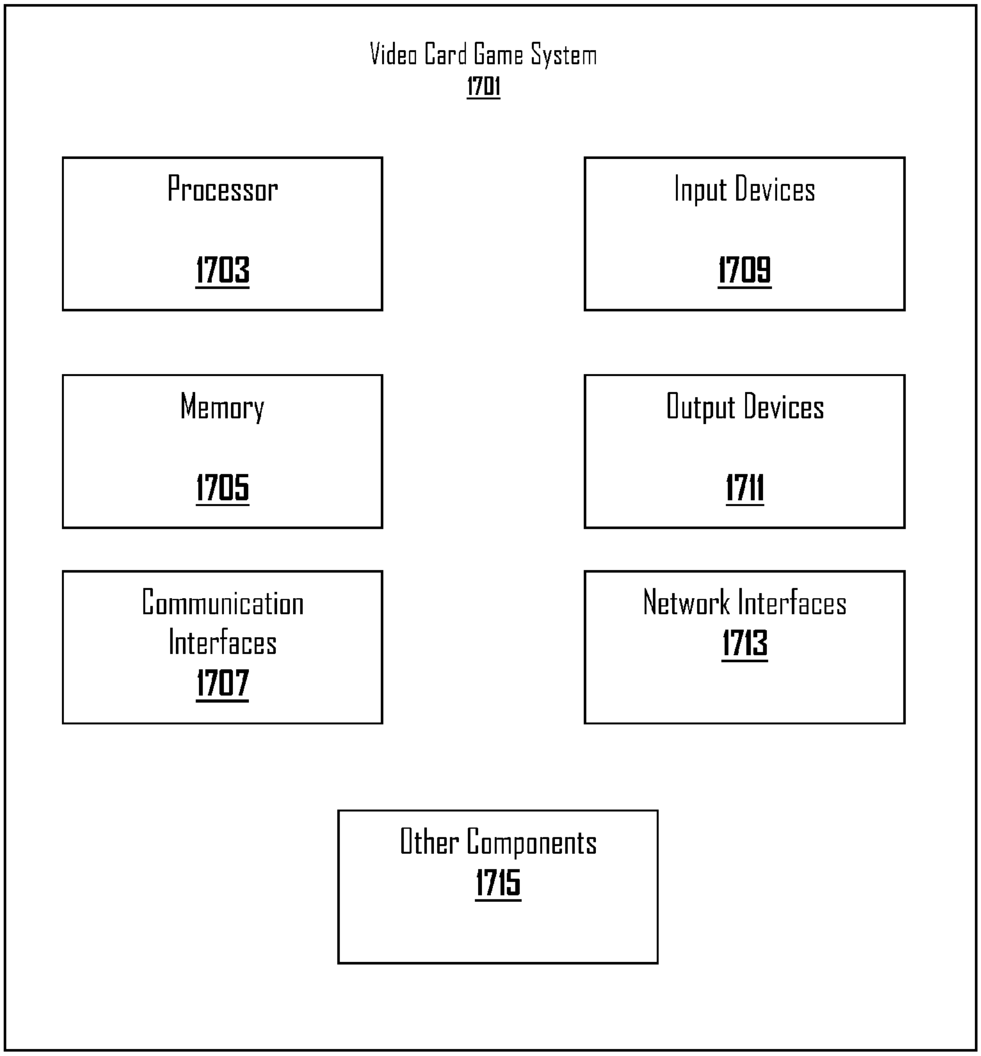
FIG. 11 illustrates various components that may be utilized in a video card game system.

FIG. 11 illustrates various components that may be utilized in a video card game system 1701. One or more systems 1701 may be used to implement the various methods disclosed herein. The illustrated components may be located within the same physical structure or in separate housings or structures. Thus, the term video card game system 1701 is used to mean one or more broadly defined computing devices unless it is expressly stated otherwise. Systems include the broad range of digital computers including microcontrollers, hand-held computers, personal computers, servers, mainframes, supercomputers, minicomputers, workstations, and any variation or related device thereof.

The system 1701 is shown with a processor 1703 and memory 1705. The processor 1703 may control the operation of the system 1701 and may be embodied as a microprocessor, a microcontroller, a digital signal processor (DSP) or other device known in the art. The processor 1703 typically performs logical and arithmetic operations based on program instructions stored within the memory 1705. The instructions in the memory 1705 may be executable to implement the methods described herein.

The system 1701 may also include one or more communication interfaces 1707 and/or network interfaces 1713 for communicating with other electronic devices. The communication interface(s) 1707 and the network interface(s) 1713 may be based on wired communication technology, wireless communication technology, or both.

The system 1701 may also include one or more input devices 1709 and one or more output devices 1711. The input devices 1709 and output devices 1711 may facilitate user input and output. Other components 1715 may also be provided as part of the system 1701.

FIG. 11 illustrates only one possible configuration of a video card game system 1701. Various other architectures and components may be utilized.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules, sections, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration and may be remote from the gaming device.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A game method for possibly providing at least one award based on a scattered combination of cards in a card game, the game method comprising:

physically or virtually dealing a plurality of hands of cards to a game player capable of winning at least one award by the method, the plurality of hands of cards including at least a first card hand and a second card hand, wherein each of the first and second card hands include at least one or more card positions, and wherein, in each of the first and second card hands, one or more cards are placed in the at least one or more card positions respectively;

analyzing characteristics associated with one or more cards in each of the first and second card hands;

scatter combining at least a first card in a first card position in the first card hand with at least a second card in a second card position in the second card hand without regard to whether the first card position and second card position comprise one or more predetermined pay lines;

determining whether a scatter winning combination of cards is formed by at least the first and second cards in the first and second card hands respectively; and if so, providing a scatter award to the game player based on the scatter winning combination of cards.

2. The game method of claim 1 wherein, in the dealing step, each of the first and second card hands include a plurality of cards in one or more card positions.

3. The game method of claim 1 wherein the characteristics associated with each card comprise a card rank and a card suit.

4. The game method of claim 1 wherein the characteristics associated with at least one card comprise a wild card characteristic.

5. The game method of claim 1, wherein the characteristics associated with each card comprise a symbol.

6. The game method of claim 1 further comprising determining whether a specific pattern is formed by the scatter combined cards.

7. The game method of claim 6 further comprising providing said scatter award also based on the specific pattern formed by the scatter combined cards.

8. The game method of claim 1 wherein the cards for each of said first and second card hands are provided from one or more decks of cards which may differ in size.

9. The game method of claim 1 further comprising comparing the scatter combination of cards to award combinations of cards provided in an award table.

10. The game method of claim 1 further comprising applying wild cards randomly to one or more cards in at least one among the plurality of card hands.

11. The game method of claim 1 further comprising applying symbols randomly to one or more card positions in at least one among the plurality of card hands.

12. The game method of claim 1, further comprising providing the game player an interface to allow the game player to navigate each of the cards displayed in at least two among the plurality of card hands.

13. The game method of claim 1 also including (i) dealing a second plurality of card hands to a second game player; and (ii) determining whether a second game player scatter winning combination of cards is formed across the second plurality of cards.

14. The game method of claim 1, wherein the first card hand comprises a first hand plurality of cards and wherein the game method further comprises:

determining whether a first hand winning combination of cards is formed by the first card hand only; and if so, providing a first hand award to the game player based on the first hand winning combination of cards.

15. The game method of claim 14 wherein the second card hand comprises a second hand plurality of cards and each among the first hand and second hand plurality of cards consist of the same number of cards.

16. A non-transitory computer-readable medium having executable instructions stored thereon for a card game that, when executed by a process, causes the processor to:

display physical or virtual dealing, to a game player capable of winning a scatter award, a plurality of hands of cards including at least a first card hand and a second card hand, wherein each of the first and second card hands include at least one or more card positions, and wherein, in each of the first and second card hands, a card is placed in at least one or more card positions;

analyze characteristics associated with each card in each displayed first and second card hand;

scatter combine at least a first card in a first card position in the first card hand with at least a second card in a second card position in the second card hand without regard to whether the first card position and second card position comprise one or more predetermined pay lines;

determine whether scatter a winning combination of cards is formed by at least the first and second cards in the first and second card hands respectively; and if so, provide a scatter award to said game player based on the scatter winning combination of cards.

17. The computer-readable medium of claim 16, wherein each of the first and second card hands include a plurality of cards in one or more card positions.

18. A game method for determining a winning outcome for a card game, the method comprising:

physically or virtually display dealing a plurality of hands of cards to a game player capable of winning at least one award, wherein each hand of cards includes at least one or more card positions, and wherein, in each of the hands of cards, a card is placed in at least one or more card positions;

analyzing characteristics associated with each card in the each displayed hand of cards;

scatter combining at least a first card in a first card position in a first card hand with at least a second card in a second card position in a second card hand without regard to whether the first card position and second card position comprise one or more predetermined pay lines;

determining whether a scatter winning combination of cards is formed by at least the first and second cards, wherein the scatter winning combination comprises at least the first and second cards having the same color, or having predetermined symbols, or having a predetermined pattern, or having a predetermined number of odd numbered cards, or having a predetermined number of even numbered cards; and if so, providing scatter win indicia to said game player based on the scatter winning combination of cards.

19. The game method of claim 18 further comprising applying wild cards randomly to one or more cards in at least one among the plurality of hands of cards.

20. The game method of claim 18 further comprising applying symbols randomly to one or more cards in at least one among the plurality hands of cards.

21. The game method of claim 18 further comprising providing the game player an interface to allow the game player to navigate each of the cards displayed in one or more of the hands of cards.

22. The game method of claim 18, also including (i) dealing a second plurality of card hands to a second game player; and (ii) determining whether a second game player scatter winning combination of cards is formed across the second plurality of cards.

* * * * *